3,137,672
**IMPACT STRENGTH OF BLENDS OF POLY-
ETHYLENE AND POLYPROPYLENE**
Jeremiah P. Lehane, Jr., Wilmington, Del., assignor to
Hercules Powder Company, Wilmington, Del., a corporation of Delaware
No Drawing. Filed Feb. 1, 1962, Ser. No. 170,502
2 Claims. (Cl. 260—41)

This invention relates to improving the impact strength of blends of polyethylene and stereoregular polypropylene and more particularly to improving the impact strength of such blends by incorporating small amounts of a copolymer of ethylene and propylene and a solid additive therein.

It is known that the physical properties of polyethylene can be modified by blending the polyethylene with stereoregular polypropylene, the blend possessing properties which are generally a linear function of the concentration of the two polymers. However, the impact strength of such blends does not follow the general rule and, in fact, is so much lower than expected that the usefulness of the blends is limited to conditions which do not require good impact strength.

It is also known that inorganic solid additives such as titania, zinc oxide, silica and the like can be incorporated in polyethylene and other thermoplastic materials to produce desirable characteristics such as opacity, increased stiffness, etc. Also, relatively small amounts of such solids can act to control crystal growth of polyethylene and thus increase its toughness and impact strength. However, we have found that it is difficult to disperse such solid additives in polyethylene-polypropylene blends, and the effect of poor dispersion is usually no increase, and sometimes a decrease, in impact strength of the blend.

The use in rather large amounts of elastomers such as polyisobutylene or amorphous ethylene-propylene copolymers to improve the impact strength of polyethylene or polypropylene has also been suggested. While these elastomers improve the impact strength of polyethylene-polypropylene blends at low temperatures, they do not significantly improve the impact strength at room temperature or above. Additionally, the relatively large amount of elastomer necessary to effect the improvement adversely affects other valuable characteristics of the blend such as stiffness and tensile strength.

In accordance with the present invention, it has been discovered that the use of about 0.5 to about 3% of an elastomeric copolymer of ethylene and propylene acts as a highly effective aid for dispersing about 0.5 to about 5.0% of finely divided solid additives in blends of polyethylene and stereoregular polypropylene containing 30 to 60% stereoregular polypropylene, all percentages being by weight of the blend, and that the resulting blends have significantly improved impact strength at both low and ambient temperatures. This in itself is an unexpected discovery since previous experience has shown that neither the ethylene-propylene copolymer nor the finely divided solid additive alone in such small amounts materially improve the impact strength of blends of polyethylene and stereoregular polypropylene.

The solid additives which are effective in the practice of this invention are finely divided inorganic solids having diameters of less than 4000 millimicrons but most effectively below 300 millimicrons and preferably 40 to 300 millimicrons. Suitable solids which have been found effective when present in the form of particles of about this same size are the various clays, particularly the hydrated aluminum silicates known as kaolin, titanium dioxide, calcium carbonate, alumina, silica, estersils (i.e., super colloidal amorphous silica coated with alkoxy groups), and the like. The substances which have the desired effect are solid under processing conditions and are insoluble and chemically inert in the polymer blend.

The elastomeric ethylene-propylene copolymers that are effective in the practice of this invention are the normally solid, rubbery copolymers. These copolymers are materials known to the art and can be prepared by copolymerizing ethylene with propylene by any of several methods, such as the methods described in Belgian Patents 535,082, 538,782, 553,655 and 583,039; and U.S. Patents 2,700,663 and 2,726,231. Those copolymers containing from about 20 to about 60 mole percent, most preferably from about 30 to about 40 mole percent, propylene residues and having a reduced specific viscosity (RSV) of from about 3.0 to about 5.0 are especially useful in this invention.

The term "reduced specific viscosity," or "RSV," as used herein is the specific viscosity corrected to zero shear gradient divided by concentration of a 0.1% solution of the polymer in decahydronaphthalene, containing 0.1 g. of the polymer per 100 ml. of the solution at 135° C.

The polyethylene-polypropylene blends of this invention are known to the art and are described in Italian Patent 549,915. They can be prepared by dissolving the individual homopolymers in a common solvent and then precipitating the mixture or eliminating the solvent by conventional methods. They can also be obtained by grinding the individual homopolymers together. Those blends containing from about 30% to about 60% stereoregular polypropylene by weight of the blend are useful in this invention. When more than about 60% polypropylene is present in the blend, impact strengths are too close to those of polypropylene to be of practical significance; when less than 30% polypropylene is present the blend more closely resembles polyethylene and has inadequate stiffness and hardness for many uses.

Various methods may be employed for introducing the ethylene-propylene copolymer and the finely divided solid additive into the polymer blend. One suitable method is to compound the copolymer with the blend on a 2-roll mill at elevated temperature (168° to 171° C.) and then, after complete dispersion of the copolymer, adding the finely divided solid additive and completing the compounding. Any of the other conventional mixing devices may also be employed. Another method is to prepare a concentrate of the copolymer in the blend, milling it in a Banbury mill, subdividing the resulting concentrate by means of a cube-cutter or similar device, dry-blending the concentrate with more polymer blend, adding the finely divided solid additive as such or as a concentrate in the dispersion of polymer blend and copolymer, and then completing the dispersion.

An essential step, however, in preparing the composition of this invention is dispersing the ethylene-propylene copolymer in the blend prior to the addition of the solid additive since the beneficial effects described above are not realized when the order of addition is reversed. The ethylene-propylene copolymer acts as a dispersing aid for the finely divided solid additive, and its presence in the polyethylene-polypropylene blend prior to addition of the solid additive is essential to the invention.

The following examples are presented as illustrations of the invention. Parts and percentages are by weight unless otherwise specified.

EXAMPLES 1-3

Thirty (30) parts of stereoregular polypropylene having a birefringent melting point of about 170° C. and an RSV of 3.2 were compounded with 70 parts of high density polyethylene having a birefringent melting point of about 132° C., a density of 0.945, and an RSV of 2.5 on a 2-roll mill at about 171° C. for 4 minutes. The resulting blend was divided into eight portions. One portion was reserved for a control. Three portions of the blend were compounded on a 2-roll mill with 1.0 part (1) coating-type kaolin having an average particle size of about 1000 millimicrons, (2) $TiO_2$ (rutile-pigment grade) having an average particle size of about 70 millimicrons, and (3) $CaCO_3$ having an average particle size of about 70 millimicrons, respectively, per 100 parts blend at 171° C. until incorporation was complete (about 8 minutes). To each of the remaining four portions of the blend were added 2.0 parts, per 100 parts blend, of an ethylene-propylene copolymer containing about 36 mole percent propylene and having an RSV of about 3.8, and the products compounded at 171° C. for about 2 minutes, this reduction in blending time being made possible by the beneficial dispersing effect of the copolymer. One of the latter four portions was reserved for a control and the remaining three portions were further compounded with 1.0 part, per 100 parts blend, of the before-mentioned kaolin, $TiO_2$ and $CaCO_3$, respectively, until incorporation was complete (about 3 minutes). Each of the portions was then subdivided and ⅛-inch cross-section specimens for tensile impact tests were die-cut from 4-inch x 4-inch x 0.025-inch sheets, compression molded for 10 minutes at 216° C. under 2000 p.s.i., and specimens for Izod impact tests were injection molded in a Mini-jector machine at about 215 to 216° C. at 750 pounds ram pressure and 40 to 10 second cycle.

The effect of the ethylene-propylene copolymer on improving the dispersion of the solid additives on impact strength of 70 to 30 polyethylene-polypropylene blends, as determined by measurement of Izod impact strength and tensile impact strength, was determined with results recorded in Table I.

The improved results obtained by the use of the copolymer as a dispersing agent are evident from the examples.

EXAMPLES 4-7

Example 3 was repeated using 0.5, 1.0, 2.0 and 3.0 parts $CaCO_3$ having a particle size of 70 millimicrons and 2.0 parts of the ethylene-propylene copolymer of Example 3 per 100 parts of the 70:30 blend of polyethylene-polypropylene. Test results on Izod impact strength at 0° C. are tabulated below.

*Table II*

| Example | Amount of $CaCO_3$ (Parts Per 100 Parts Blend) | Izod Impact Strength at 0° C.[1] |
|---|---|---|
| 4 | 0.5 | 1.1 |
| 5 | 1.0 | 1.2 |
| 6 | 2.0 | 1.2 |
| 7 | 3.0 | 1.2 |
| Control | | 1.0 |

[1] ASTM D-256-56.

EXAMPLES 8-11

Following the procedure set forth in Examples 1-3, stereoregular polypropylene having a birefringent melting point of about 170° C. and an RSV of 3.2 was compounded with varying amounts of polyethylene having an RSV of 2.5 and a density of 0.945. The blends so produced were then compounded with, per 100 parts of blend, 1.0 part $CaCO_3$ having a particle size of 70 millimicrons and 2.0 parts ethylene-propylene copolymer having about 36 mole percent of propylene and an RSV of 3.8. The effect of the ethylene-propylene copolymer and $CaCO_3$ on the various blends is demonstrated by means of notched Izod impact strengths at 0° C. recorded in Table III. Improvement comparable to that shown in Table I was noted for Izod impact strength at 23° C. and for tensile impact tests at 0 and 23° C. while stiffness and tensile strength values were not adversely affected by the additives.

*Table I*

EFFECTS OF SOLID ADDITIVE AND ETHYLENE-PROPYLENE COPOLYMER ON IZOD IMPACT STRENGTH AND TENSILE IMPACT STRENGTH OF 70:30 POLYETHYLENE:POLYPROPYLENE BLEND

| Example | Composition | Amount of Additive (Parts/100 Parts Blend) | | Izod Impact Strength [1] | | Tensile Impact Strength [2] | |
|---|---|---|---|---|---|---|---|
| | | Ethylene-Propylene Copolymer | Solid Additive | 0° C. | 23° C. | 0° C. | 23° C. |
| Controls | | | | | | | |
| A | Blend | | | 1.2 | 2.0 | 25 | 47 |
| B | Blend+Kaolin | | 1.0 | 1.0 | 2.3 | | 50 |
| C | Blend+$TiO_2$ | | 1.0 | 1.1 | 2.6 | | 44 |
| D | Blend+$CaCO_3$ | | 1.0 | 0.9 | 2.4 | | 56 |
| E | Blend+Ethylene-Propylene Copolymer | 2.0 | | | | 44 | 56 |
| 1 | Blend + Kaolin + Ethylene-Propylene Copolymer | 2.0 | 1.0 | 1.4 | 3.8 | 50 | 73 |
| 2 | Blend+$TiO_2$+Ethylene-Propylene Copolymer | 2.0 | 1.0 | 1.6 | 4.2 | 50 | 78 |
| 3 | Blend + $CaCO_3$ + Ethylene-Propylene Copolymer | 2.0 | 1.0 | 1.4 | 4.1 | 57 | 88 |

[1] ASTM D-256-56.
[2] ASTM D-1822-61T.

Table III

EFFECT OF ETHYLENE-PROPYLENE COPOLYMER AND $CaCO_3$ ON IZOD IMPACT STRENGTH (0° C.) OF VARIOUS POLYETHYLENE-POLYPROPYLENE BLENDS

| Example | Blend; Polyethylene: Polypropylene | Izod Impact Strength 0° C.[1] | |
|---|---|---|---|
| | | Control (No Additive) | 2.0 Parts Ethylene-Propylene Copolymer and 1.0 Part $CaCO_3$ |
| 8 | 70:30 | 1.0 | 1.2 |
| 9 | 60:40 | | 1.1 |
| 10 | 50:50 | 0.7 | 0.8 |
| 11 | 40:60 | | 0.6 |

[1] ASTM D-256-56.

What I claim and desire to protect by Letters Patent is:

1. The method of improving the impact strength of blends containing 40 to 70% by weight polyethylene and 60 to 30% stereoregular polypropylene, which comprises intimately mixing said blend with from about 0.5 to about 3.0% by weight of said blend of an elastomeric copolymer of ethylene with propylene and then intimately blending the mixture with from about 0.5 to 5.0% by weight of said blend of a finely divided inorganic solid additive having a particle size of 40 to 4000 millimicrons.

2. The method of claim 1 wherein the finely divided solid additive is selected from the group consisting of kaolin, $TiO_2$, and $CaCO_3$, said additive having a particle size of 40 to 4000 millimicrons.

References Cited in the file of this patent

UNITED STATES PATENTS

| 3,018,263 | Schneider | Jan. 23, 1962 |
| 3,036,987 | Ranalli | May 29, 1962 |

FOREIGN PATENTS

| 875,132 | Great Britain | Aug. 16, 1961 |